US006425055B1

(12) United States Patent
Sager et al.

(10) Patent No.: US 6,425,055 B1
(45) Date of Patent: Jul. 23, 2002

(54) WAY-PREDICTING CACHE MEMORY

(75) Inventors: David J. Sager; Glenn J. Hinton, both of Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/256,846

(22) Filed: Feb. 24, 1999

(51) Int. Cl.[7] .............................................. G06F 12/00
(52) U.S. Cl. ........................ 711/118; 711/128; 711/137; 711/140; 712/222; 712/238; 714/7; 714/805; 714/763
(58) Field of Search ................................. 711/128, 137, 711/140, 118; 712/222, 238; 714/7, 805, 763

(56) References Cited

U.S. PATENT DOCUMENTS

| | | |
|---|---|---|
| 4,888,773 A | 12/1989 | Arlington et al. ............ 714/764 |
| 4,899,342 A | 2/1990 | Potter et al. ................ 714/6 |
| 4,920,539 A | 4/1990 | Albonesi .................. 714/764 |
| 5,127,014 A | 6/1992 | Raynham .................. 714/754 |
| 5,233,616 A | 8/1993 | Callander .................. 714/758 |
| 5,263,032 A | 11/1993 | Porter et al. ............... 714/764 |
| 5,267,242 A | 11/1993 | Lavallee et al. ............ 714/7 |
| 5,274,645 A | 12/1993 | Idleman et al. ............. 714/6 |
| 5,274,646 A | 12/1993 | Brey et al. ................ 714/758 |
| 5,325,375 A | 6/1994 | Westberg ................. 714/805 |
| 5,367,526 A | 11/1994 | Kong ..................... 714/805 |
| 5,388,108 A | 2/1995 | DeMoss et al. ............. 714/6 |
| 5,392,302 A | 2/1995 | Kemp et al. .............. 714/805 |
| 5,428,630 A | 6/1995 | Weng et al. .............. 714/763 |
| 5,430,742 A | 7/1995 | Jeddeloh et al. ............ 714/764 |
| 5,510,934 A | 4/1996 | Brennan et al. |
| 5,526,504 A | 6/1996 | Hsu et al. |
| 5,537,538 A | 7/1996 | Bratt et al. |
| 5,717,892 A | 2/1998 | Oldfield |
| 5,809,524 A | 9/1998 | Singh et al. |
| 5,835,928 A | 11/1998 | Auslander et al. |
| 5,845,320 A | 12/1998 | Pawlowski |
| 5,845,323 A | 12/1998 | Roberts et al. |
| 5,848,428 A * | 12/1998 | Collins .................. 711/127 |
| 5,931,943 A * | 8/1999 | Orup .................... 712/222 |
| 5,956,746 A * | 9/1999 | Wang .................... 711/137 |
| 6,016,533 A * | 1/2000 | Tran .................... 711/128 |
| 6,016,545 A * | 1/2000 | Mahalingaiah et al. ...... 712/238 |

OTHER PUBLICATIONS

Steven A. Przybylski, New Dram Technologies, © 1994, 1996. Publisher; MicroDesign Resources; Sebastopol, CA. pp. 1–306.

R8000 Microprocessor Chip Set; Product Overview, Webpage [online].Silicon Graphics. [Retrieved on Oct. 24, 1998] Retrived from the Internet; wysiwg://16/http://www.sgi.com/processors/r8000/product/book.html #55554 pp. 1–26.

Peter Yan–Tek Hsu, Design of the R8000 Microprocessor. Mountian View, CA; Jun. 2, 1994. pp. 1–16. Silicon Graphics, MIPS Group.

* cited by examiner

*Primary Examiner*—Do Hyun Yoo
*Assistant Examiner*—Mehdi Namazi
(74) *Attorney, Agent, or Firm*—Blakely, Sokoloff, Taylor & Zafman LLP

(57) ABSTRACT

An apparatus and method for accessing a cache memory. In a cache memory, an address is received that includes a set field and a partial tag field, the set field and the partial tag field together including fewer bits than necessary to uniquely identify a region of memory equal in size to a cache line of the cache memory. The set field is decoded to select one of a plurality of storage units within the cache memory, each of the plurality of storage units including a plurality of cache lines of the cache memory. The partial tag field is compared to a plurality of previously stored partial tags that correspond to the plurality of cache lines within the selected one of the plurality of storage units to determine if the partial tag field matches one of the plurality of previously stored partial tags. If the one of the previously stored partial tags matches the partial tag field, one of the plurality of cache lines that corresponds to the one of the plurality of previously stored partial tags is output.

36 Claims, 6 Drawing Sheets

WAY-PREDICTING CACHE MEMORY

FIELD OF THE INVENTION

The present invention relates to the field of data processing and more particularly to method and apparatus for caching data in a data processing system.

BACKGROUND OF THE INVENTION

Cache memories are relatively small, high-speed memories used to reduce memory access time in modern computer systems. The idea is to store data from frequently accessed regions of system memory in cache memory so that subsequent accesses to the cached regions will not incur the full system memory access time, but the shorter cache access time instead. A memory transaction that accesses cache memory instead of system memory is called a cache hit, and the cache "hit rate" is a fundamental metric of cache design.

FIG. 1 illustrates a prior art cache memory 12 that includes a data store 14 and a tag store 16. In effect, the cache memory 12 is a data buffer in which each entry in the data store 14 is mapped to a region of system memory by a corresponding entry in the tag store 16. When an address is asserted to system memory, set and tag fields within the address are used to determine whether an entry in the cache memory 12 is mapped to the region of system memory sought to be accessed. The set field (sometimes called an index) is decoded to select an entry in the data store 14 and a corresponding entry in the tag store 16. An address value, called a "tag," is output from the selected tag store entry and compared with the tag field of the asserted address. If the tag field of the asserted address matches the tag output from the selected tag store entry, a cache hit is signaled to indicate that the selected entry in the data store is mapped to the region of system memory sought to be accessed. In the case of a memory read operation, a cache line (i.e., the unit of information in a cache) is output from the selected entry in the data store and returned to the requestor. Low order bits of the input address may be used to select a sub-portion of the cache line according to the width of the transfer path to the requestor and the width of data that can be handled by the requester. Write requests are handled similarly, except that data is written to the selected entry in the data store 14.

The cache memory 12 is referred to as a direct mapped cache because only one cache line is stored in the cache for each possible value of the set field. That is, system memory is directly mapped to the cache based on the set field so that there is only one tag field in the tag store 16 per value of the set field. One undesirable consequence of direct mapping is that a cache miss will occur in response to each new memory address for which the set field, but not the tag field, matches a previously asserted address. Thus, if a sequence of memory accesses are directed to system memory addresses that have the same set fields but different tag fields, a significant number of cache misses will occur and data from the different system memory addresses will be frequently swapped into and out of the cache memory 12; a phenomenon called "thrashing." An alternate mapping scheme, called multiple-way, set associative mapping, is used to avoid this sort of thrashing.

FIG. 2 illustrates a prior-art four-way, set associative cache memory 26 in which each set field is mapped to as many as four system memory addresses. Instead of a single data store, there are four data stores (28A–28D), called "data ways," and instead of a single tag store, there are four tag stores (30A–30D), called "tag ways." In effect, the direct mapped operation described above occurs in parallel for each of the four data ways and four tag ways. When a memory address is received, the set field is used to select a respective cache line from each of the four data ways and also to select a respective tag from each of the four tag ways. Each of the selected tags is compared against the tag field of the input cache address to generate a corresponding tag way hit signal. The tag way hit signals are input to hit logic 31 which asserts or deasserts a cache hit signal based on whether any of the tag way hit signals indicates a match. Assuming a cache hit, the hit logic generates a data way select signal that indicates which of the tag ways contains the tag matching the tag field of the input address. The data way select signal is supplied to a multiplexer 32 to select the source of the cache line output to be the data way that corresponds to the tag way containing the tag matching the tag field.

Because the same set field is associated with multiple tag addresses in a multiple-way, set associative cache memory, the type of thrashing that can occur in direct mapped caches is usually avoided. Consequently, a multiple-way, set associative cache tends to achieve a higher hit rate than a direct mapped cache having the same sized data store. The higher hit rate is not without cost, however, because the increased logic required to generate the way select signal and to select one of the plurality of set-field-selected cache lines increases the overall time required to output a cache line. This is in contrast to a direct mapped cache which outputs a cache line as quickly as the set field can be decoded and the selected cache line can be driven onto the return data path.

SUMMARY OF THE INVENTION

An apparatus and method for accessing a cache memory are disclosed. A memory address is asserted that includes a set field and a tag field that together uniquely identify a region of system memory equal in size to a cache line in a cache memory. A partial tag field that includes less than all bits in the tag field is compared against a partial tag entry stored in the cache memory. A cache line is output from the cache memory if the partial tag field matches the partial tag entry.

DESCRIPTION OF THE DRAWINGS

The present invention is illustrated by way of example and not limitation in the figures of the accompanying drawings in which like references indicate similar elements and in which.

DETAILED DESCRIPTION

A multiple-way cache memory is disclosed in which way selection is performed in parallel with set field decoding to reduce the amount of time required to output a cache line. To speed the way selection operation, a partial tag field that includes only a subset of the bits of a full tag field is compared to previously stored partial tags to select one of a plurality of data ways. Because only a subset of the full tag field is used to select a data way, the way selection is speculative in nature and is therefore referred to as a way prediction. The hit signal and data output in response to the way prediction are also speculative in nature and are accordingly referred to as a speculative hit signal and speculative data, respectively.

Because the way selection is performed in parallel with the set field decoding and because the way selection time is reduced by virtue of the partial tag field comparison, speculative data can usually be output from the cache data store substantially faster than with prior art cache memories that perform full tag field comparison, followed by a multiplexed routing of one of a plurality of data way outputs to the cache memory output. This and other intended advantages of the present invention are described below.

Figure 1:
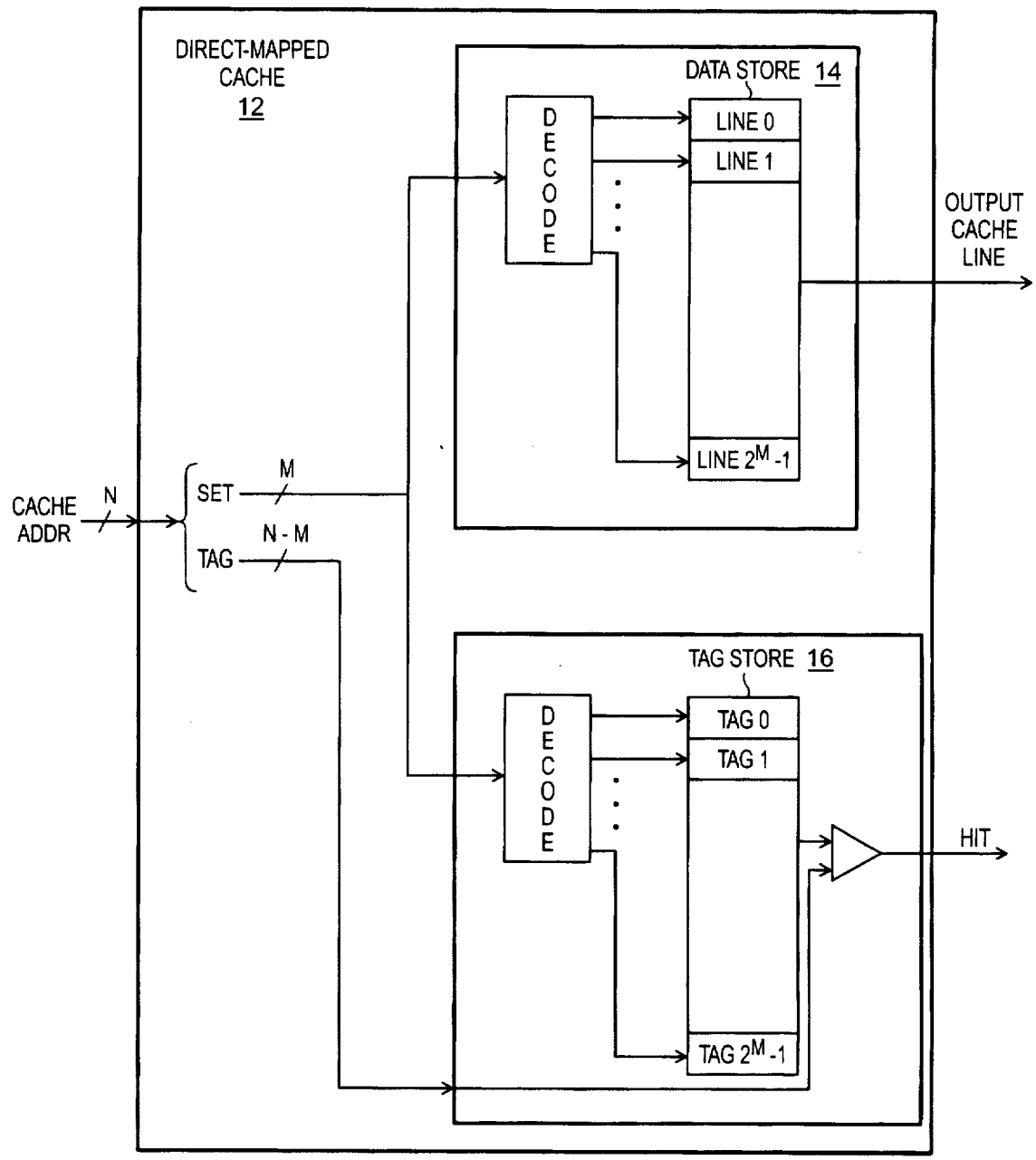
FIG. 1 illustrates a prior art cache memory that includes a data store and a tag store.
Figure 2:
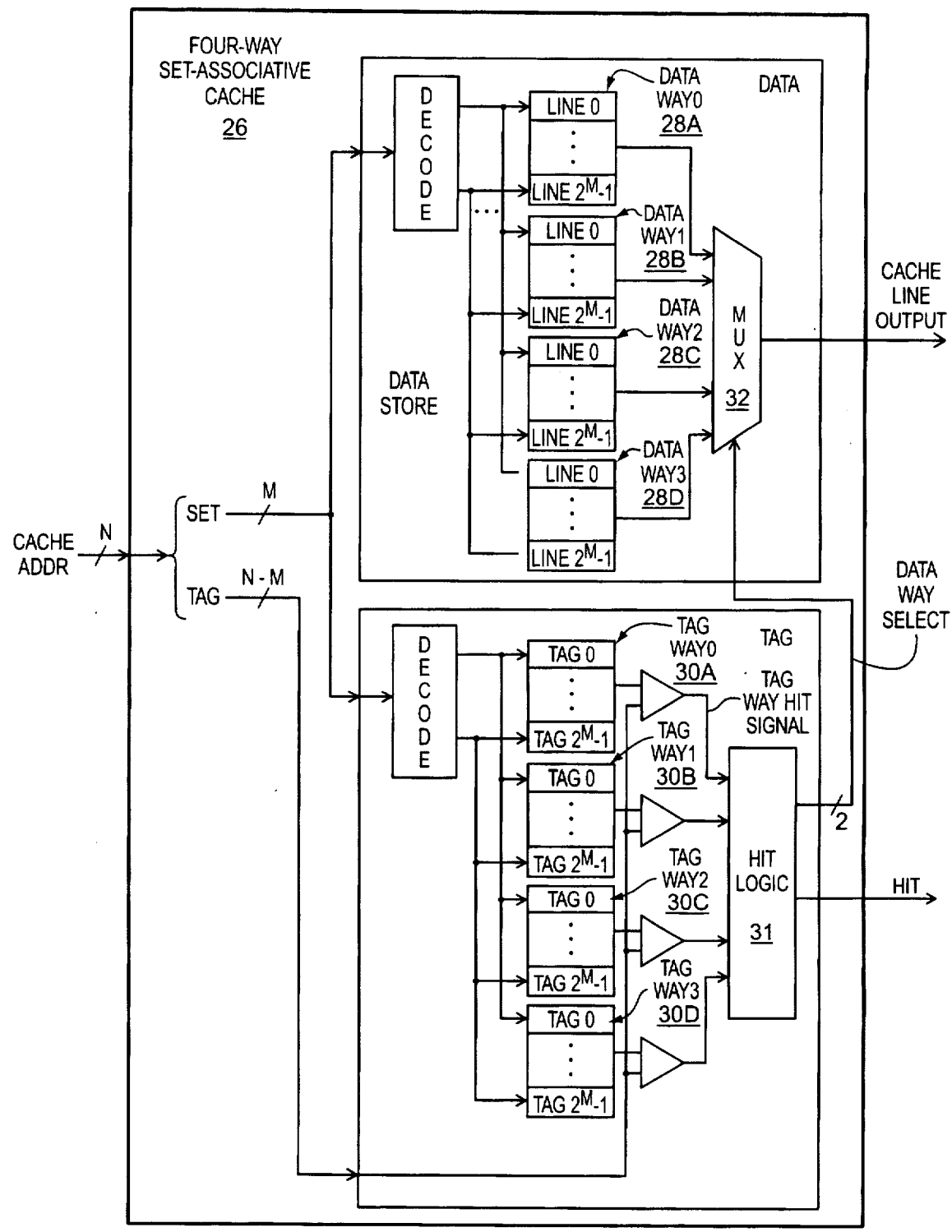
FIG. 2 illustrates a prior-art four-way, set associative cache memory.
Figure 3:
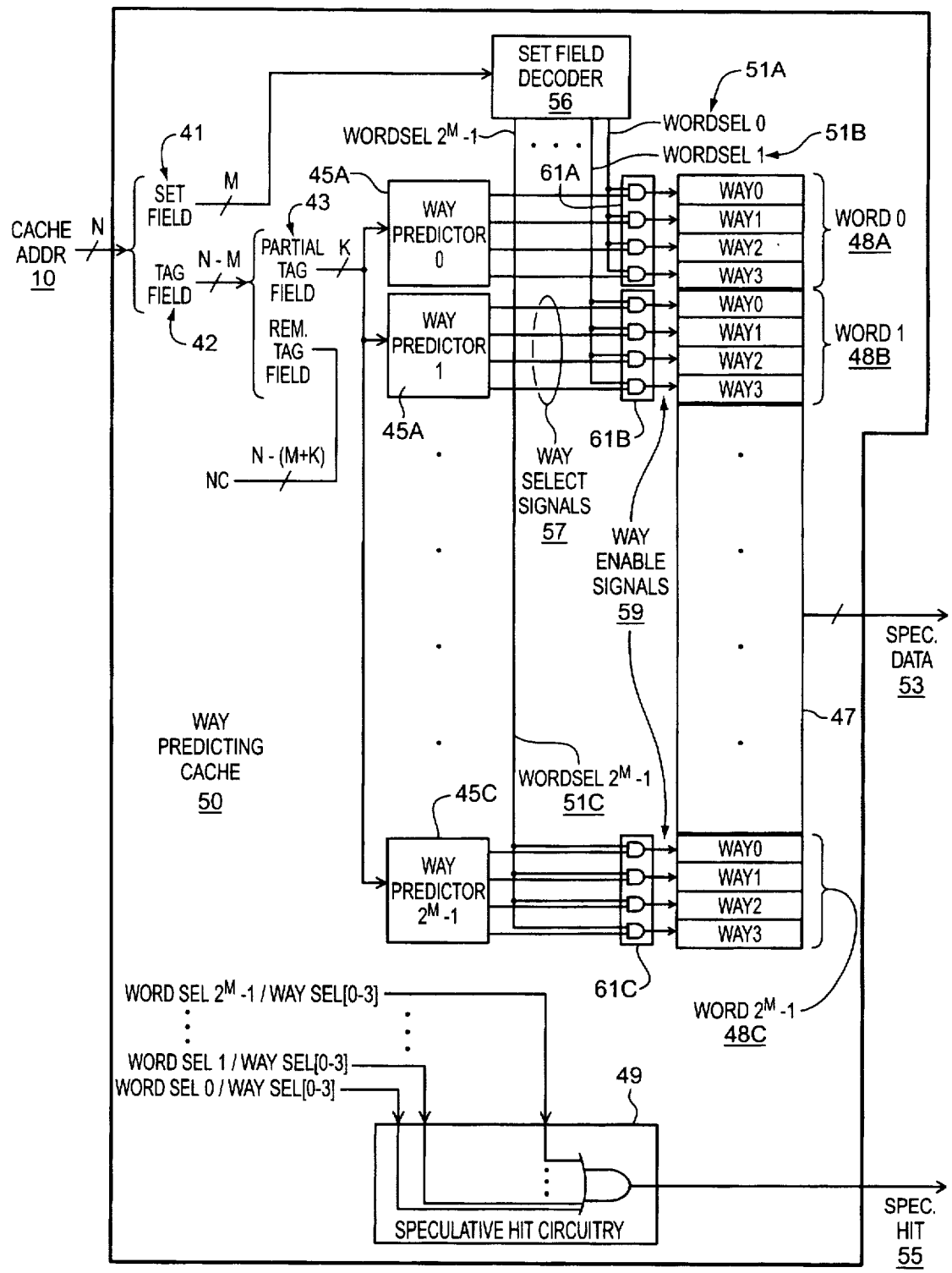
FIG. 3 depicts a way-predicting cache memory according to one embodiment.

FIG. 3 depicts a way-predicting cache memory 50 according to one embodiment. The cache data store 47 is arranged as a sequence of words 48A–48C that each include four data ways (e.g., WAY0–WAY3 in cache word 48A). The four data ways in each word 48A–48C are each used to store a respective cache line. A set field decoder 56 is provided to decode the set field 41 of each incoming cache address 10 and to assert a word select signal on one of a plurality of word select lines 51A–51C indicated by the decoded set field. A plurality of way predictors 45A–45C, one for each word 48A–48C in the cache data store 47, is provided to compare a partial tag field 43 of the cache address 10 against previously stored partial tags. If a match is detected in a way predictor, the way predictor outputs one of a plurality of way select signals 57 to indicate which data way within a cache word 48A–48C corresponds to the partial tag that resulted in the match. Each of the plurality of word select lines 51A–51C is coupled to a respective group of way select gates 61A–61C for a corresponding cache word 48A–48C of the data store 47. Consequently, if a partial tag match occurs in a way predictor that corresponds to a cache word that is also selected by a word select signal from the set field decoder, one of the data ways in the word will be selected and the cache line therein will be output as speculative data 53.

Each cache address asserted by the requester is an N-bit address that includes an M-bit set field 41 and an N–M bit tag field 42. The full address asserted by the requestor may include additional low order bits that resolve a unit of data smaller than a cache line. The M-bit set field 41 is applied to the set field decoder 56, while a partial tag field 43 (i.e., K bits of the tag field 42, where K<(N–M)) is applied to each of a plurality of way predictors 45A–45C. To emphasize that less than all the bits of the tag field 42 are used to form the partial tag field 43, the full tag field 42 is illustrated as being input to the cache memory in FIG. 3, with the unused bits of the tag field 42 (i.e., N–(M+K) bits) being not connected. This is not necessary, of course, and in a preferred embodiment, only the set field 41 and the partial tag field 43 of the cache address 10 are input to the cache memory. In one embodiment, the K bits of the partial tag field form a continuous address with the set field (i.e., the least significant bit of the partial tag is one position of significance higher than the most significant bit of the set field). In alternate embodiments, the K bits of the partial tag field 43 may be taken from other bit positions within the tag field 42. As discussed above, the set field decoder 56 decodes the incoming set 41 and asserts one of the word select lines 51A–51C in response. Concurrently with the decode operation in the set field decoder 56, each of the way predictors 45A–45C compares the partial tag field 43 against previously stored partial tags to determine whether there is a match. Each way predictor 45A–45C outputs a plurality of way select signals 57 to a respective group of way select gates 61A–61C so that, as described above, if a partial tag match occurs in a way predictor 45A–45C for which the corresponding word line 51A–51C is enabled, the data way indicated by the partial tag match will be selected and the cache line therein will be output as speculative data 53. Because the decode operation in the set field decoder 56 is performed concurrently with the partial tag compare operation in the way predictors 45A–45C, both the set field 41 and the partial tag field 43 are effectively provided as address inputs to the cache data store 47. This is in contrast to prior art devices in which the set field 41 alone is used to address a plurality of data ways and way enable signals are applied at second stage of the cache output to select one of a plurality of cache lines output from the data ways.

Still referring to FIG. 3, the way enable signals 59 asserted to the respective data ways of the cache data store 47 are logically combined in a speculative hit circuitry 49 to determine whether a hit has occurred. If so, the speculative hit circuitry 49 asserts a speculative hit signal 55. In one embodiment, the inputs to the speculative hit circuitry 49 are the way enable signals 59 applied to each of the words 48A–48C of the cache data store 47 and are therefore labeled "WORDn/WAY SELECT [0–3]" in FIG. 3 (WORDn refers to cache words 0 through $2^M-1$). In an alternate embodiment, the signals supplied to the speculative hit circuitry 49 may be generated by different logic circuits such as combinatorial logic circuits within the individual way predictors 45A–45C (e.g., by ORing the way select signals together and then 45A–45C (e.g., by ORing the way select signals together and then ANDing the OR'd result with the corresponding word select line), or elsewhere in the way predicting cache 50.

Figure 4:
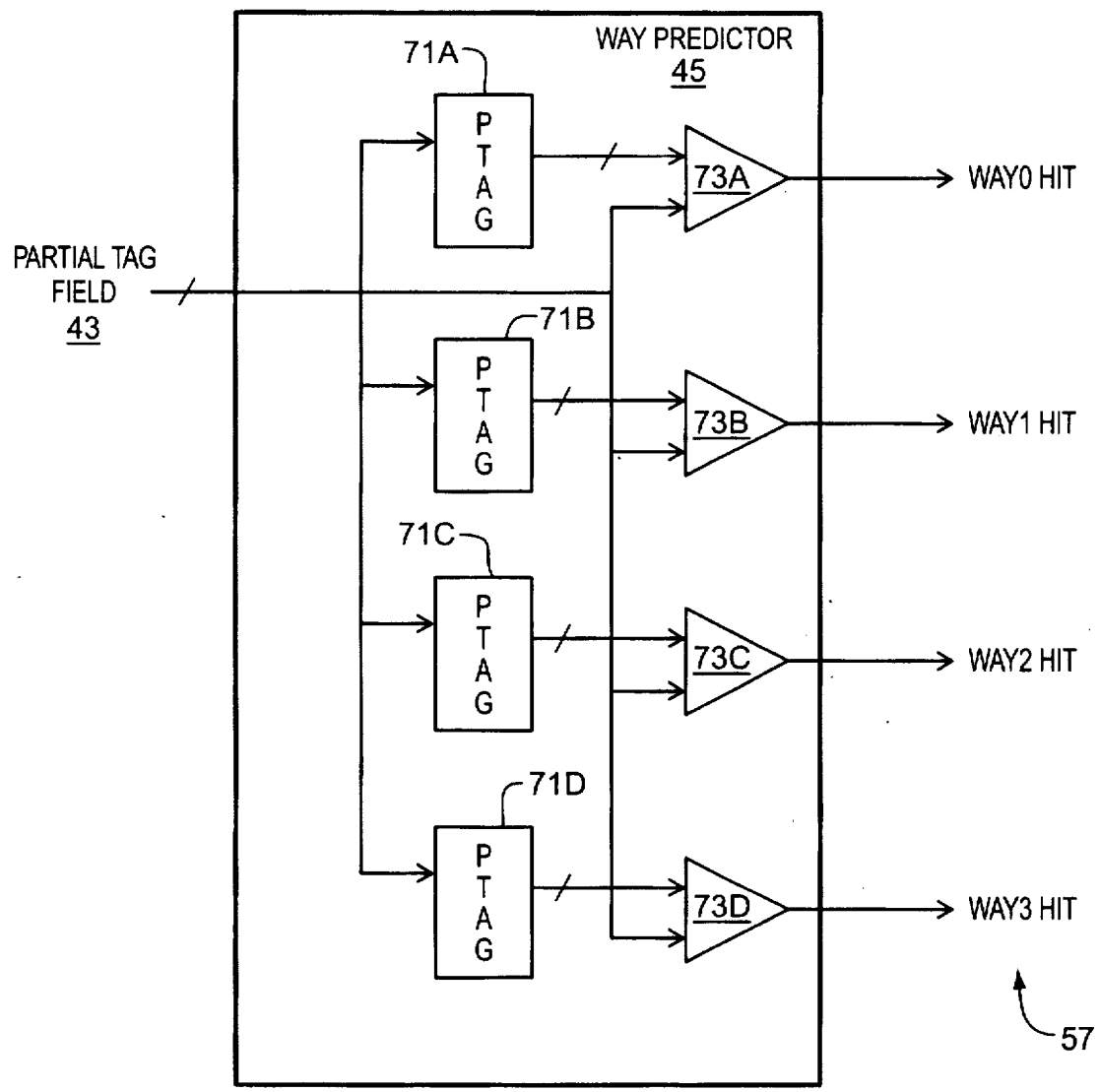
FIG. 4 illustrates a way predictor according to one embodiment.

FIG. 4 illustrates a way predictor 45 according to one embodiment. The way predictor 45 includes a plurality of partial tag registers 71A–71D (four, in this exemplary embodiment). A partial tag (PTAG) is stored in each partial tag register 71A–71D and is output to an input of a corresponding one of a plurality of comparators 73A–73D. The other input of each comparator 73A–73D is coupled to receive the partial tag field 43. If, in a given comparator 73A–73D, a partial tag field 43 is determined to match the partial tag stored in a partial tag register 71A–71D, the comparator asserts a way select signal 57. The partial tag registers 71A–71D within a given way predictor 45 are prevented from containing duplicate partial tag values so that at most one of the way select signals 57 is asserted by the way predictor 45 at a time.

The partial tag field 43 is supplied to each of the partial tag registers 71A–71D so that the partial tag register can be reloaded with a new partial tag. The replacement strategy used to load new values into the partial tag registers 71A–71D within a way predictor 45 and into the data ways within the cache data store 47 is discussed below.

Figure 5:
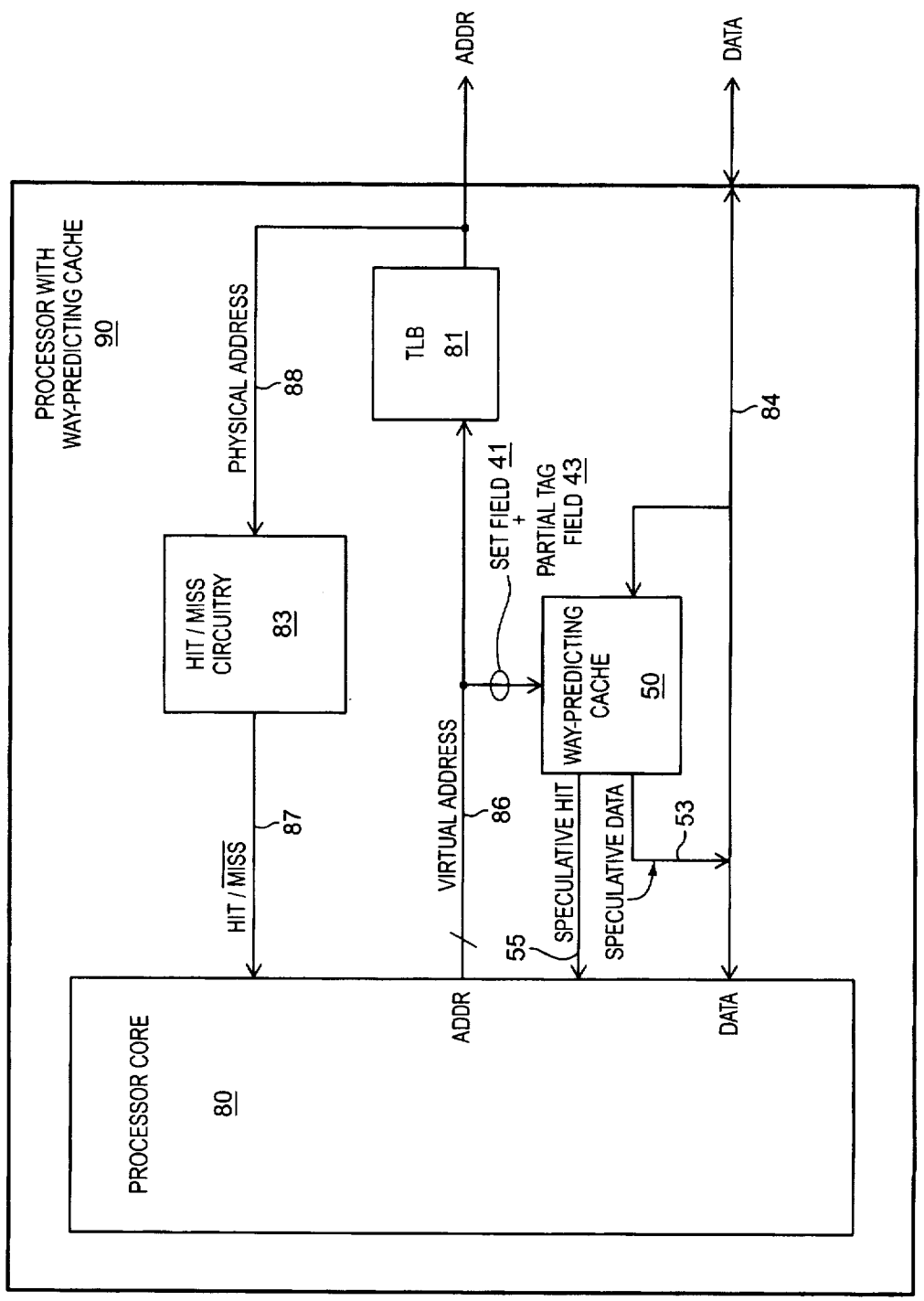
FIG. 5 illustrates a processor that includes a way predicting cache.

FIG. 5 illustrates a processor 90 that includes a way predicting cache 50 according to the above-described embodiment. When the processor core 80 asserts a virtual address on an address path 86 within the processor 90, the way predicting cache 50 receives at least the set field 41 and partial tag field 43 of the virtual address 86 and issues a speculative hit signal 55 and speculative data 53 (if there is a speculative hit) in response. The processor core 80 receives the speculative data 53 via a data path 84 and may begin processing the speculative data 53 through a pipeline for eventual use in an instruction execution. If the way predicting cache 50 is used as an instruction cache, the speculative data 53 may include an instruction (or a number of instructions) for execution in the processor core 80. If the way predicting cache 50 is used as a data cache, the speculative data 53 may include data to be operated on during instruction execution in the processor core 80. If the way predicting cache 50 is used as a combined data and instruction cache, the speculative data 53 may include instructions, data or both instructions and data to be processed in the processor core 80.

At the same time that the way predicting cache 50 operates to determine whether a speculative hit 55 has occurred, a translation look aside buffer 81 (TLB) is used to convert the virtual address 86 to a physical memory address 88. The physical address is supplied to hit/miss circuitry 83 which includes a full physical address tag that corresponds to each partial tag in the way predicting cache 50. As a result, sometime (e.g., several clock cycles) after a speculative hit signal 55 is output by the way-predicting cache, the hit/miss logic compares the tag field of the physical address 88 of the access request against physical address tags to determine whether an actual hit or miss has occurred. An actual hit or miss is signaled to the processor core 80 by a hit/miss signal 87.

If an actual hit has occurred, then the processing performed on the speculative data 53 in the intervening time between output of the speculative data 53 from the way-predicting cache 50 and the assertion of the hit/miss signal 87 by the hit/miss circuitry 83 is validated. Otherwise, the speculative hit signal 55 is determined to have been a false hit signal and the speculative data 53 is determined to have been false data. In that event, the way predicting cache 50 is loaded with new data via the data path 84 (e.g., from system memory or from another cache memory in response to the physical address 88 asserted by the TLB 81) and with a corresponding partial tag from the virtual address 86. Similarly, if the speculative hit signal 55 is not asserted initially (i.e., the virtual address 86 misses the way-predicting cache), then the way predicating cache 50 is loaded with a new partial tag from the virtual address 86 and with new data obtained via the data path 84.

It will be appreciated that the benefit of advanced data output from the way-predicting cache becomes more pronounced as the percentage of correct speculative hits (i.e., speculative hits that are not ultimately determined to be false) is increased. Accordingly, it is desirable to increase the partial tag size to a size that achieves a relatively high percentage of correct speculative hits, but that does not introduce significantly longer comparison delay than the set field decode delay. According to one embodiment, it is found that by using a partial tag that includes the number of bits necessary to resolve the number of ways in a given cache word (e.g., $\log_2$(no. ways)) plus three or four additional bits, a sufficiently high percentage of correct speculations can be achieved to realize the benefit of the advanced data output of the way-predicting cache. For example, in one embodiment, a five-bit partial tag is used to generate speculative hit information for a cache having four data ways per cache word (e.g., a five-bit partial tag field out of a complete tag field of twenty or more bits). In alternate embodiments, the number of bits in the partial tag may vary from the number of bits necessary to resolve the number of ways per cache word to any number of bits that is fewer than the number of bits in the complete tag field.

Figure 6:
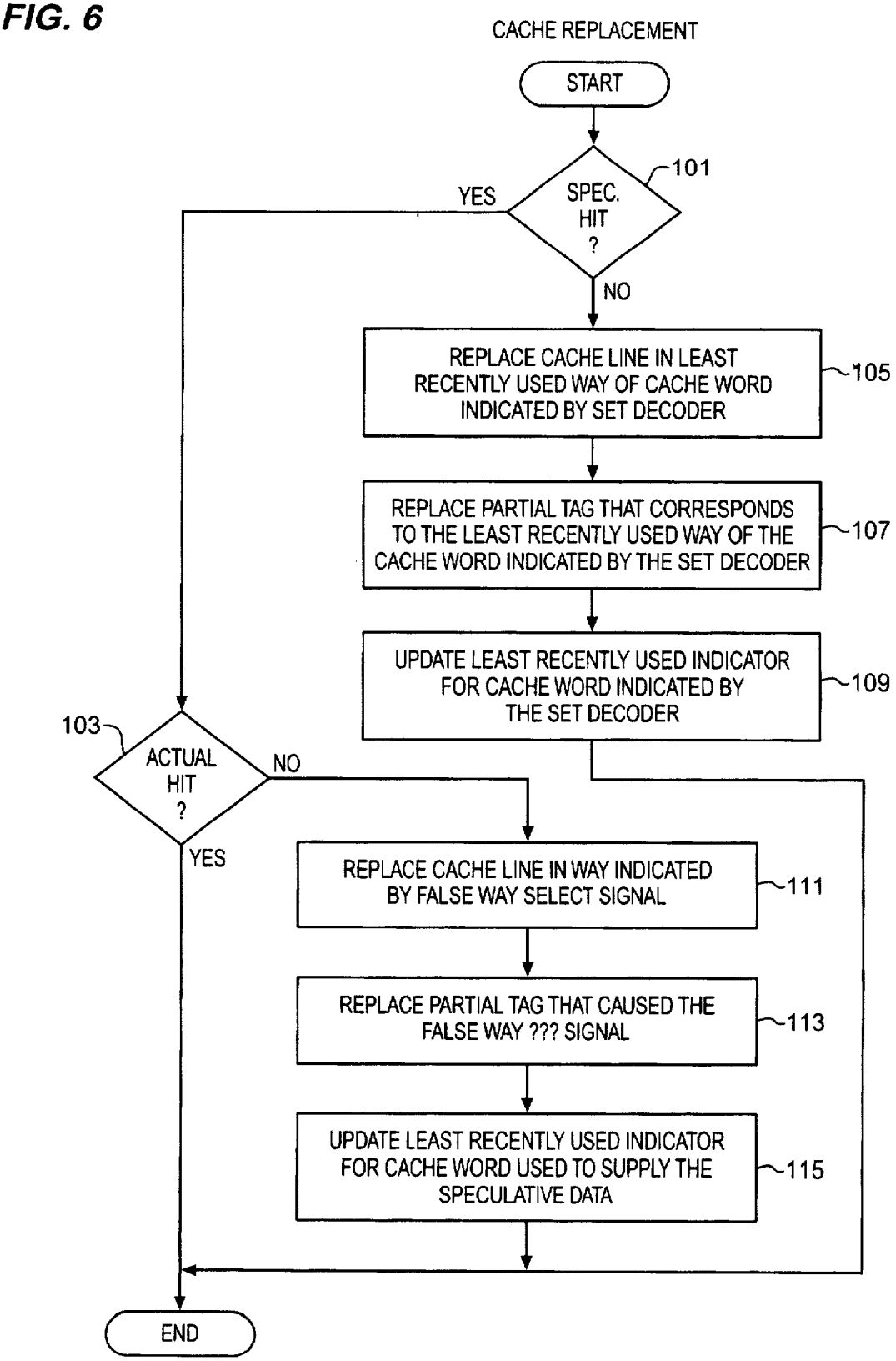
FIG. 6 illustrates a cache replacement strategy for a way predicting cache memory according to one embodiment.

FIG. 6 illustrates a cache replacement strategy for a way predicting cache memory according to one embodiment.

Starting at decision block 101, if a speculative hit has occurred in response to a memory access request, then decision block 103 is entered to determine if an actual hit has occurred. If an actual hit has occurred, then the memory access request actually hit the way predicting cache and no replacement of data or partial tags is necessary. If, at decision block 101, a speculative hit is not detected, then at block 105, the cache line in the least recently used way of the cache word indicated by the set field decoder (e.g., element 56 of FIG. 3) is replaced. Referring to FIG. 5, for example, the data returned on the data path 84 is input to the way predicting cache memory and stored in the least recently used data way. According to one embodiment, a least-recently-used bit (LRU bit) is associated with each data way in the cache data store to indicate that the data way (and its corresponding partial tag register) is to be overwritten with new data if a miss occurs. One LRU bit is set per group of data ways that form a given cache word. When a miss occurs on the data ways of a selected cache word, the data way indicated by its LRU bit to be the least recently used data way within the cache word is updated with new data, and another data way within the cache word is selected to be the new least-recently-used data way and its associated LRU bit is set. In one embodiment, referred to as a pseudo-least-recently-used technique, the selection of the new least-recently-used data way is predetermined by combinatorial logic based on the previous least-recently used data way. In an alternate embodiment, referred to as a true least recently-used technique, LRU bits associated with the data ways of a given cache word indicate not only the least recently used data way, but also the next least recently used data way and so forth to the most recently used data way. In this arrangement, the relative usage order of the different data ways is evaluated by combinatorial logic to identify a new least-recently-used data way after the existing least recently used data way is updated with new data. Still referring to FIG. 6, at block 107, the partial tag that corresponds to the least recently used way of the cache word indicated by the set field decoder is replaced with a partial tag that corresponds to the cache line stored in the cache data store in block 105. At block 109, the least recently used indicator for the cache word indicated by the set field decoder is updated.

If it is determined at block 103 that, despite the speculative hit indicated by the way predicating cache memory, a cache miss has occurred, then the cache line in the data way indicated by the false way enable signal (i.e., the way enable signal giving rise to the false speculative hit) is replaced at block 111. At block 113, the partial tag that caused the false way signal is replaced with the partial tag that corresponds to the replacement cache line. At block 115, the least recently used indicator for the cache word used to supply the speculative data is updated.

Although a cache replacement strategy based on specific least recently used techniques has been described, other least recently used techniques and cache replacement techniques other than least recently used techniques may be used in alternate embodiments.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly to be regarded in an illustrative rather than a restrictive sense.

What is claimed is:

1. A method comprising:

asserting a memory address that includes a set field and a tag field that together uniquely identify a region of system memory equal in size to a cache line in a cache memory;

decoding the set field;

comparing a partial tag field that includes less than all bits in the tag field against a plurality of previously stored partial tag entries in parallel with the decoding; and outputting a cache line from the cache memory if the partial tag field matches a partial tag entry of the plurality of previously stored partial tag entries.

2. The method of claim 1, wherein the partial tag field includes a least significant bit of the tag field.

3. The method of claim 1, wherein outputting the cache line from the cache memory comprises outputting a cache line that has been obtained from a memory address that includes at least the set field and the partial tag field.

4. The method of claim 1, wherein comparing the partial tag field that includes less than all bits in the tag field against the plurality of previously stored partial tag entries comprises comparing a partial tag field that includes less than half the bits in the tag field against the plurality of previously stored partial tag entries.

5. The method of claim 1:

wherein the cache memory includes a plurality of data ways organized within cache words; and wherein the partial tag field includes a number of bits sufficient to uniquely select one of the plurality of data ways within one of the cache words.

6. The method of claim 5, wherein each of the plurality of data ways is used to store a respective cache line.

7. The method of claim 1, further comprising generating a word select signal that corresponds to one of a plurality of cache words within the cache memory based on the decoding of the set field, each of the plurality of cache words including a plurality of cache lines.

8. The method of claim 7, wherein comparing the partial tag field against the plurality of previously stored partial tag entries comprises comparing the partial tag field against a plurality of previously stored partial tag entries that correspond to the selected one of the plurality of cache words.

9. The method of claim 7, wherein outputting a cache line from the cache memory if the partial tag field matches the partial tag entry comprises generating a way select signal that corresponds to a data way containing the cache line based on which of the plurality of partial tag entries matches the partial tag field.

10. The method of claim 9, wherein outputting the cache line from the cache memory comprises logically combining the word select signal and the way select signal to enable the cache line to be output.

11. A method comprising:

receiving an address that includes a set field and a partial tag field, the set field and the partial tag field together including fewer bits than necessary to uniquely identify a region of memory equal in size to a cache line of a cache memory;

decoding the set field to select one of a plurality of storage units within the cache memory, each of the plurality of storage units including a plurality of cache lines of the cache memory;

comparing the partial tag field to a plurality of previously stored partial tags that correspond to the plurality of storage units in parallel with said decoding to determine if the partial tag field matches one of the plurality of previously stored partial tags; and outputting one of the plurality of cache lines that corresponds to one of the plurality of previously stored partial tags if the one of the previously stored partial tags matches the partial tag field.

12. The method of claim 11, wherein said decoding the set field is performed substantially concurrently with said comparing the partial tag field.

13. The method of claim 11, wherein comparing further comprises:

comparing the partial tag field to a plurality of previously stored partial tags that correspond to a first storage unit that is selectable by a first set field, the first storage unit having a plurality of cache lines; and comparing the partial tag field to a plurality of previously stored partial tags that correspond to a second storage unit that is selectable by a second set field, the second storage unit having a plurality of cache lines.

14. An apparatus comprising:

an input path to receive an M-bit set field and a K-bit partial tag field of an address that includes an R-bit tag field, K being less that R;

a set field decoder coupled with the input path to receive the set field and to use the set field to select a plurality of cache lines;

a plurality of way predictors coupled with the input path to each store a plurality of partial tags, to each subsequently receive the partial tag field, and each comprising a plurality of comparators to compare the partial tag field with the plurality of stored partial tags and to select a cache line if the partial tag field matches a stored tag; and selection circuitry coupled with the set field decoder, the plurality of way predictors, and a cache line to output the cache line if it is selected by the set field decoder and a way predictor of the plurality.

15. The apparatus of claim 14, further comprising:

a processor to perform at least one operation on a speculative data value of the output cache line, and concurrently with said step of performing at least one operation, comparing] and to concurrently compare the R-bit tag field to a plurality of R-bit tag fields that have been previously stored in a tag memory to determine whether the speculative data value is a data value indicated by an address including the R-bit tag field and M-bit set field.

16. The apparatus of claim 14, wherein the set field decoder is a set field decoder to decode the set field concurrently with the comparators comparing the partial tag field with the stored partial tags.

17. The apparatus of claim 14, wherein the K-bit partial tag field includes less than half the bits in the R-bit tag field.

18. The apparatus of claim 14, contained within a processor to assert the set field and the partial tag field on the input path and to process data of the output cache line.

19. The apparatus of claim 14, contained within a processor means.

20. The apparatus of claim 14, wherein the plurality of way predictors comprises a way predictor means.

21. The apparatus of claim 14, further comprising:

a processor core coupled with the input path to provide the set field and the partial tag field, to receive data from the output cache line, and to concurrently execute an operation on the data; and tag comparison circuitry to determine whether the data corresponds to the R-bit tag field by comparing at least .

a portion of the R-bit tag field that is not included in the K-bit tag field with previously stored tag data.

22. The apparatus of claim 14, wherein the partial tag field includes a number of bits sufficient to uniquely select one of the plurality of cache lines selected by the set field decoder.

23. The apparatus of claim 14:

wherein the select circuitry includes a plurality of logic gates that each have a first input line coupled with the set field decoder, a second input line coupled with a way predictor of the plurality of way predictors, and an output line coupled with a cache line; and wherein the plurality of logic gates includes a logic gate to assert a signal on the output line indicating to output the cache line when the logic gate receives a signal on the first input line indicating the plurality of cache lines selected by the set field decoder and receives a signal on the second input indicating a cache line selected by the way predictor.

24. An apparatus comprising:

a cache memory comprising a first plurality of cache lines operable to be selected by a first set field and a second plurality of cache lines operable to be selected by a second different set field;

set decode circuitry to select the first plurality of the cache lines by decoding an input set field and by determining that the set field matches the first set field; and way prediction circuitry to select one cache line of the first plurality of the cache lines by comparing a partial tag field to a first plurality of previously stored partial tags corresponding to the first plurality of cache lines and a second plurality of previously stored partial tags corresponding to the second plurality of cache lines and by determining that the partial tag field matches a partial tag of the first plurality.

25. The apparatus of claim 24, wherein the partial tag field includes a least significant bit of a full tag field.

26. The apparatus of claim 24:

wherein the cache memory comprises a plurality of cache words including a first cache word comprising the first plurality of cache lines and a second cache word comprising the second plurality of cache lines; and wherein the set decode circuitry is coupled with a plurality of word select lines, each word select line to select a respective one of the plurality of cache words according to the decode of the set field by the set decode circuitry.

27. The apparatus of claim 24, wherein the way prediction circuitry includes a first way predictor coupled with the first plurality of cache lines by a corresponding plurality of way select lines and a second way predictor coupled with the second plurality of cache lines by a corresponding second plurality of way select lines.

28. The apparatus of claim 27:

wherein the first way predictor comprises a plurality of partial tag storage elements that correspond to the plurality of way select signal lines; and wherein the first way predictor is a predictor to assert a way select signal on a way select line if the corresponding partial tag storage element contains a partial tag that matches the partial tag field.

29. The apparatus of claim 24, wherein the set decode circuitry and the way prediction circuitry are operable to select substantially concurrently and in parallel.

30. The apparatus of claim 24, wherein the way prediction circuitry comprises way prediction circuitry to select based on a partial tag field that includes less than half the bits in a full tag field.

31. The apparatus of claim 24, contained within a processor to assert the set field and the partial tag field and to process data of the selected one cache line.

32. The apparatus of claim 24, contained within a processor means.

33. The apparatus of claim 24, wherein the way prediction circuitry comprises a way predictor means.

34. The apparatus of claim 24, further comprising:

a processor core to provide the set field and the partial tag field, to receive data from the selected one cache line, and to execute an operation based on the data; and tag comparison circuitry to determine whether the data corresponds to a full cache address containing the set field and a full tag field that contains the partial tag field by comparing at least a portion of the full tag field that is not included in the received partial tag field with previously stored tag data.

35. The apparatus of claim 24, wherein the partial tag field includes a number of bits sufficient to uniquely select one of the first plurality of cache lines.

36. The apparatus of claim 24, further comprising selection circuitry containing a plurality of logic gates that each have a first input line coupled with the set decode circuitry, a second input line coupled with a way prediction on circuitry, and an output line coupled with a cache line, wherein the plurality of logic gates includes a logic gate to assert a signal on an output line indicating to output a cache line when a logic gate receives a signal on the first input line indicating the first plurality of cache lines selected by the set decode circuitry and receives a signal on a second input line indicating the cache line selected by the way prediction circuitry.

* * * * *

UNITED STATES PATENT AND TRADEMARK OFFICE
Certificate

Patent No. 6,425,055 B1　　　　　　　　　　　　　　　　　Patented: July 23, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: David J. Sager, Portland, OR; Glenn J. Hinton, Portland, OR; Eric M. Becker, Hillsboro, OR; and Giao N. Pham, Portland, OR.

Signed and Sealed this Third Day of December 2002.

DO H. YOO
*Supervisory Patent Examiner*
Art Unit 2187